United States Patent [19]
Vaatainen

[11] Patent Number: 6,054,836
[45] Date of Patent: Apr. 25, 2000

[54] ELECTRIC MOTOR STARTER FOR STARTING MOTORS ROTATING AT SYNCHRONOUS SPEED

[75] Inventor: Heikki Vaatainen, Espoo, Finland

[73] Assignee: Avepoint Oy, Helsinki, Finland

[21] Appl. No.: 09/329,256

[22] Filed: Jun. 10, 1999

Related U.S. Application Data

[63] Continuation of application No. PCT/FI97/00534, Sep. 9, 1997.

[30] Foreign Application Priority Data

Sep. 10, 1996 [FI] Finland ..................................... 963564

[51] Int. Cl.⁷ ....................................................... H02P 1/26
[52] U.S. Cl. ........................... 318/778; 318/445; 318/491
[58] Field of Search .................................... 318/778, 445, 318/491; 370/426

[56] References Cited

U.S. PATENT DOCUMENTS 5,451,925  9/1995  Le ............................................ 340/426

*Primary Examiner*—Karen Masih
*Attorney, Agent, or Firm*—Watson Cole Grindle Watson, P.L.L.C.

[57] ABSTRACT

The present invention relates to an electric motor starter for starting motors rotating at synchronous speed. The starter comprises a programmable logic circuit having input ports for receiving control commands intended for the electric motor and supervisory signals reporting the operating state of the motor, and output ports for drive signals intended for the electric motor and information signals reporting the operating state of the motor. The logic circuit comprises stored therein various logical motor starter connections for various electric motors. Further the starter comprises means for selecting for use one of the various motor starter connections stored in the logic circuit; and connection means for connecting a control according to the drive signals to the electric motor.

9 Claims, 1 Drawing Sheet

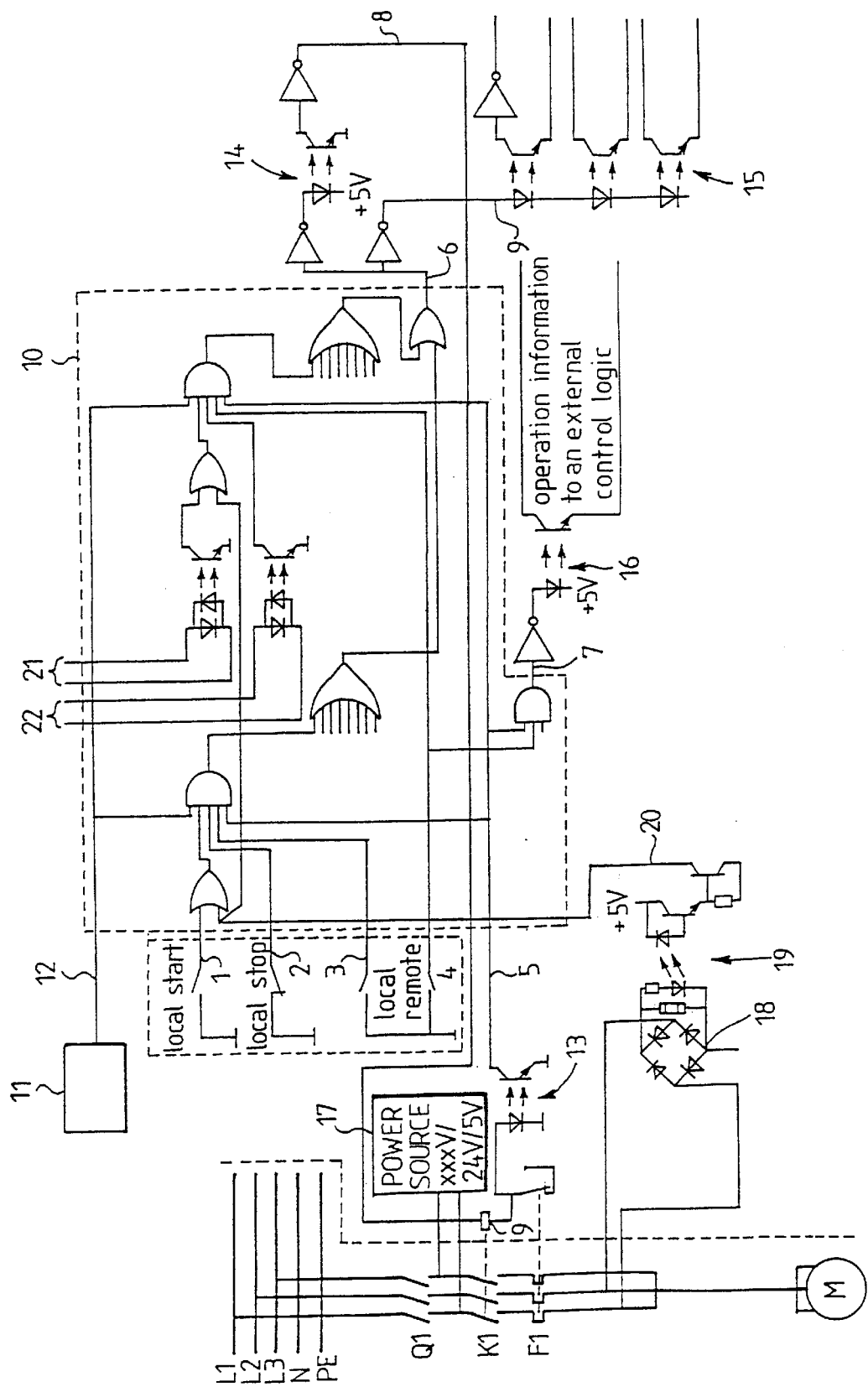

ELECTRIC MOTOR STARTER FOR STARTING MOTORS ROTATING AT SYNCHRONOUS SPEED

RELATED APPLICATIONS

This is a continuation of International PCT Application PCT/F197/00534, filed on Sep. 9, 1997.

BACKGROUND OF THE INVENTION

The invention relates to an electric motor starter for starting motors rotating at synchronous speed.

The electric motor starter of the invention is particularly suited to be used as a controller of electric motors and in that case to replace an ON/OFF-starter controlling an electric motor. The controller is not, however, suitable for starting motors whose speed of rotation is controlled linearly, such as controlled by an inverter, but it is only intended for motors rotating at a so-called synchronous speed which speed is thus dependent on the frequency of the supplying electrical network.

There are various types of electric motor starters depending on the structure of the electric motor to be controlled and their purpose of use and they comprise an equipment adapted for the electric motor to be started at each time, such as a switching contactor according to the power/current of the motor, and a thermal relay. Starters of a single-speed electric motor, of a two-speed electric motor with two windings, of a dahlander-connected motor, of a star/delta connected motor and the like could be mentioned as various starter and motor types. The different operating modes of motors cause dimensioning and installation problems and connection errors as it is not always exactly known at the beginning of planning what kind of a motor is to be used and how the motor will be logically controlled and which additional devices/components are needed in addition to the motor to make the system to be controlled to operate correctly. Installation, planning, drafting and testing of such an ordinary motor starter built of discrete parts (contactors, thermal relays, time relays, switches, push-button switches, lines, etc.), whereby in more complicated cases the probability of a connection and planning error grows considerably. The typically used components are components controlled by the mains current, such as relays and contactors, in which case the conductors intended for the main voltage and a suitable installation manner have to be used in their supply and control lines.

Because of the above, logic circuits are also used in motor starters. Such starters are known e.g. from U.S. Pat. No. 5,206,572 and GB 2,206,423. They disclose solutions where the logical connection required for controlling the motor is achieved by means of semiconductor circuits. When such constructions are used, the logical connection has to be planned and either built of discrete components or programmed separately for each programmable logic circuit for each different purpose and motor type. When the motor type or the control mode of the motor changes, either the discrete components or the connection between them have to be changed or a new program has to be developed and a program thereof has to be stored in the case of a programmable logic circuit. The motor starters based on the use of logic circuits, described in the references cited, are therefore tailored for the purpose and it is relatively difficult to carry out changes.

SUMMARY OF THE INVENTION

The object of the present invention is to introduce a electric motor starter for starting motors rotating at synchronous speed by means of which the above problems relating to electric motor starters, for example, such as suitability for starting only one motor type, can be eliminated. This is attained with the controller of the invention, which comprises a programmable logic circuit having input ports for receiving control commands intended for the electric motor and supervisory signals reporting the operating state of the motor, and output ports for drive signals intended for the electric motor and information signals reporting the operating state of the motor, the logic circuit comprising stored therein various logical motor starter connections for various types of electric motors;

means for selecting for use one of the various motor starter connections stored in the logic circuit; and connection means for connecting a control according to the drive signals to the electric motor.

When using the electric motor starter of the invention the type or the control mode of the electric motor need not be known in advance but the operation or logical motor starter connection to be used can be selected only after installation by a very simple practical procedure. When the starter of the invention is used as an independent device, the means for selecting for use some motor starter connection stored in the logic circuit can comprise a code switch, such as a HEX switch, and a decoder for providing a selection signal for the logic circuit to make it select for use the required logical motor starter connection. If the starter of the invention is under the control of a more extensive logic system, the means for selecting for use some motor starter connection stored in the logic circuit comprise a logic system controlling the starter, such as a programmable logic controller or a general-purpose computer.

BRIEF DESCRIPTION OF THE DRAWING

In the following, the electric motor starter of the invention is described in more detail with reference to the appended drawing in which the FIGURE shows an exemplary embodiment of a schematic logic diagram arranged to be a starter of a single-speed electric motor.

DESCRIPTION OF THE PREFERRED EMBODIMENT

In the FIGURE, an electric motor M which is supplied by a three-phase network comprising phases L1, L2 and L3. From this network, the electric current is connected to the motor M, which in the described case is a three-phase and single-winding electric motor, via a main switch Q1, a switching contactor K1 controlled by a motor starter and a thermal relay F1. All these components have three phases. The present invention relates in particular to a motor starter controlling the switching contactor K1.

It is substantial in the motor starter of the invention that it comprises a logic circuit 10 to which is pre-programmed various logical control connections intended to control various electric motors and possibly to provide different modes of use. Such starter types are starters of a single-speed electric motor, of a dahlander-connected electric motor, of a star/delta connected motor, and so on. In these logical connections, the power of the electric motor to be controlled needs not to be taken into consideration at all because a connecting contractor is used as an actual control component of the electric motor, the switching contactor receiving its constant level control from said logic circuit 10.

In the FIGURE of the drawing, the programmable logic circuit 10 is described as including various logic components, which generate logical operations required from the starter of the single-speed electric motor. It is to be understood that this connection is only shown by way of example and illustration, because in practice, it is a connection by means of which the components included in the logic circuit can be made to generate such a logical operation. Each logical connection stored in the programmable logic circuit 10 generates at least to some extent a different logical operation. For this reason, the exemplary logic components included in the logic circuit 10 are not described in more detail, but only the input ports and output ports of the circuit 10 are referred to.

In the FIGURE, the programmable logic circuit 10 is disclosed as including several input ports 1, 2, 3, 4, 5, 12, 20, 21 and 22. Of these, the input ports 1–4 are associated with a manual operation unit in connection with the starter, by means of which unit local start and local stop can be provided and local or remote control can be selected for the respective input ports 1–4. When remote control is selected, the start information is derived at the input port 21 and the stop information at the input-port 22. The input port 5 is connected via the switch controlled by the thermal relay F1 to an optoisolator 13 from which it is informed whether the thermal relay F1 has been released.

The input port 12 is associated with means 11 for selecting the logical operation the programmable logic circuit provides at each one time. At its simplest, the control circuit 11 can contain a multi-level switch, such as a HEX switch, and an internal decoder by means of which a suitable control signal is generated for selecting the logical operation according to which the programmable logic circuit operates at each one time. The HEX switch is only one exemplary alternative of a code switch by which the code for selecting the program is given. In place of the HEX switch, by which 16 different codes can be generated, it is also possible to use various other types of code switches, such as electrically programmed BCD switches, for example, to provide the desired number of different selection codes.

The unit 11 selecting the mode of operation, that is, the pre-programmed logical connection can also be a standard industrial computer or a general-purpose computer, such as a PC or a programmable logic controller PLC. An advantage of standard computers is that because of high production numbers of these equipments, their unit price will be advantageous. This kind of a standard computer does not either confine the buyer of the equipment only to one equipment supplier. In that case it is also possible to restore the equipment with reasonable costs.

The programmable logic unit 10 comprises output ports 6 and 7. Via the output port 6, control information is transmitted to a coil 9 controlling the switching contactor K1. This information is transmitted along a line 8 via an optoisolator 14. The same information is also transmitted to a line 23 where it can be forwarded via an optoisolator 15 to a programmable logic controller controlling the starter or to a general-purpose computer, for example. From the output port 7 it is informed via an optoisolator 16 that the electric motor M is operating.

One original feature of the connection shown in the FIGURE is that the operating voltage for the starter is derived from phases L1 and L3 of the supply line of the electric motor M, the required operating voltages, such as 24 V and 5 V, being provided by a suitable power source, such as a switched mode power supply. The power source is indicated with reference numeral 17. In the motor supply line, now after the thermal relay F1, an optoisolator 19 is connected to phases L1 and L2 via a rectification bridge 18, which optoisolator informs whether there is a voltage between the phases L1 and L2. Information about the voltage between the phases L1 and L2 is conveyed to the programmable logic circuit 10 via the input port 20. It reports whether one of the phases L1 or L2 is dead. As the power supply was connected between the phases L1 and L3 and the supervision of existence of voltage between the phases L1 and L2, the programmable logic circuit 10 knows if some of the supply phases are dead, in which case the switching contactor K1 can be opened immediately, when required. This arrangement cancels out the possibility of the motor having a so-called 2-phase operation which can result in that the motor will break down. The arrangement will guarantee that if one phase of the motor is without voltage, the relevant motor starter will be released at once without delay, if desired. The fact that it is without delay is based on that the programmable logic circuit 10 attends to motor starting and collection of alarm/control data without the help of a possible external controlling computer, whereby the required control operations take place considerably faster than in case the running time of the controlling computer program should be taken into account. By means of the controller of the invention, in time-critical applications it is possible by arranging suitably the control data to provide an instantaneous control event in which only the port delays of the programmable logic circuit have to be taken into consideration.

When using the electric motor starter of the invention, planning, installation and testing of control systems will become easier and faster. A particular reason for this is that the starter of the invention is suitable for industrial serial production at least as far as the programmable logic circuit and its peripheral components are concerned. The required switching contactor or contactors and/or other coupling relaying can be attached to the assembly possibly on its discrete circuit board by means of a multiple-pole connector, for example. Standard general-purpose computers or industrial computers are suitable to be used as a possible control system, in which case it is easy to update the system and obtain repair parts. The electrical motor starter of the invention, when appropriately programmed, is suitable for use in the control of various different types of electrical motors in various types of systems, only by selecting appropriately the logical motor starter connection with which the starter operates at each time.

The programmable logic circuit included in the starter of the invention can be easily programmed for new purposes. This programming can be made either by means of a general-purpose computer or a specific programming system. The programmable logic circuit can have a varying construction. GDS, EEPLD, FPGA, PAL, GAL, PLD, CPLD, EPLD, gate array, macro array, and the like can be mentioned as examples of different programmable circuit types.

Furthermore, the logical motor starter connection which the controller of the invention provides can be selected very simply by only a HEX switch, for example, and no rewiring will be needed for the control unit. It follows from the programmability of the significant part of the controller, that is, of the programmable logic circuit that any input port can be selected by programming for a specific operation, that is, it is not necessary to know, when the starter is being wired, in which kind of use the starter will operate, but without changes to wiring, the required connection can be provided just by means of software.

The programming of the programmable logic circuit can be made electrically either when the logic circuit is in place in the controller or separately by placing the logic circuit in a discrete programming unit. Programming can also be made by remote control via a modem or a control bus, for example. All the controlling of the starter of the invention takes place at a low voltage (<50 V) and no power current cables are needed for wiring, which makes installation both easier and more advantageous in costs. A further advantage of the starter of the invention is that it operates totally independently in individual use, but it is also suitable to be controlled by a programmable logic controller (PLC) or a general-purpose computer either individually or in groups. The control system need not either be defined in advance. As mentioned above, the power controlled by the controller of the invention is not limited. Only the contactors, thyristors and other such devices in the power control section are selected according to the required power.

What is claimed is:

1. An electric motor starter for starting motors rotating at synchronous speed comprising a programmable logic circuit having input ports for receiving control commands intended for the electric motor and supervisory signals reporting the operating state of the motor, and output ports for drive signals intended for the electric motor and information signals reporting the operating state of the motor, the logic circuit having stored therein various logical motor starter connections for various types of electric motors;

means for selecting for use one of the various motor starter connections stored in the logic circuit; and connection means for connecting a control according to the drive signals to the electric motor.

2. An electric motor starter according to claim 1, wherein the means for selecting for use one of the various motor starter connections stored in the logic circuit comprises a code switch, and a decoder for providing a selection signal for the logic circuit causing said logic circuit to select for use the required logical motor starter connection.

3. An electric motor starter according to claim 1, wherein the means for selecting for use one of the various motor starter connections stored in the logic circuit comprises a logic for controlling the electric motor starter.

4. An electric motor starter according to claim 3, wherein the logic circuit further includes an individual identifier code stored therein for each one of the various motor starter connections stored in the logic circuit.

5. An electric motor starter according to claim 3, wherein the logic system comprises at least one of a programmable logic controller, a general purpose computer and a PC.

6. An electric motor starter according to claim 2, wherein the code switch comprises a HEX switch.

7. A starter for starting various types of synchronous motors comprising a programmable logic circuit including input ports for receiving control commands for the electric motor and supervisory signals indicative of the operating state of the motor, and output ports for producing drive signals for the electric motor and information signals indicative of the operating state of the motor, said logic circuit having stored therein a plurality of selectable logical motor starter connections for the various types of electric motors;

means for selecting one of the plurality of selectable motor starter connections stored in the logic circuit; and connection means for connecting the drive signals to the electric motor.

8. An electric motor starter according to claim 7, wherein the means for selecting one of the motor starter connections comprises at least one of a code switch, a programmable logic controller and a general-purpose computer.

9. An electric motor starter according to claim 8, wherein the logic circuit further includes an individual identifier code stored therein for each one of the motor starter connections stored in the logic circuit.

* * * * *